TRANSMISSION SYSTEM UTILIZING INDEPENDENT DIVERSITY RECEPTION ON PLURAL SIDEBAND COMPONENTS

Filed Jan. 14, 1966

Inventor
Francis R. Steel Jr.
BY
Mueller, Aichele & Rauner
ATTYS.

3,462,554

TRANSMISSION SYSTEM UTILIZING INDEPENDENT DIVERSITY RECEPTION ON PLURAL SIDEBAND COMPONENTS

Francis R. Steel, Jr., Northbrook, Ill., assignor to Motorola, Inc., Franklin Park, Ill., a corporation of Illinois Filed Jan. 14, 1966, Ser. No. 520,710
Int. Cl. H04b 1/02, 1/16
U.S. Cl. 179—15 5 Claims

ABSTRACT OF THE DISCLOSURE

A radio transmission system utilizing multiplexed signal modulation on plural subcarriers wherein the carrier and both sidebands are transmitted. A receiver separates the plural sideband subcarrier components of both the upper and lower sidebands and diversity combines each of the subcarriers independent of the others. Detection of the modulation is then effected.

This invention relates to a frequency division multiplex system with separate reception of each frequency modulated (FM) sideband subcarrier component.

It has long been known that it is quite difficult to maintain sideband coherence with double sideband modulation techniques when the transmission medium is characterized by severe multipath delays. This difficulty has been overcome through the use of single sideband moduation for the high frequency (HF) long haul transmissions which encounter severe multipath because of ionospheric reflections. Single sideband modulation has been used especially for amplitude modulated (AM) signals because AM generates only the characteristic first order sidebands. In this case, the phase relationship of the one sideband with respect to the carrier is not essential and phase coherence is not necessary between the two sidebands.

Because FM signals generate in addition to the first order sideband components, higher order sideband components which are integral multiples of the modulating frequencies, the higher order sideband component can overlap other first order sideband component. For this reason, it is disadvantageous to use FM single sideband techniques when a complex modulating waveform (such as a multiplexed signal) is needed. Furthermore, because of the troubles which have been experienced when the sideband coherence could not be maintained the prior available systems are not applicable to all the problems.

It is an object of the present invention to provide an FM transmission system with a plurality of channels which provides a proper signal for separate detection of the principal components of both sidebands when a complex modulating waveform is used.

It is another object of the invention to provide an independent sideband component detection system for use over a long range FM transmission link with a plurality of channels and with a small coherent bandwidth, wherein the upper and lower sideband are utilized in the detection process without requiring a coherence between both the sidebands.

It is a further object of the invention to provide an FM transmission system for a plurality of channels with independent sideband component detection for reliable long range communication, wherein the equipment is relatively simple and inexpensive.

A feature of the invention is the provision of a multichannel system with frequency division multiplexed subcarriers which frequency modulate a carrier frequency with an equal and relatively low modulation index on all subcarriers, and the provision of separate sideband detection for each FM sideband subcarrier components.

Another feature of the invention is the provision of a separate receiver channel for each subcarrier.

Still another feature of the invention is the provision of a diversity combiner coupled to each one of corresponding receiver channels of the upper and lower FM sideband component.

The invention is illustrated in the drawings, wherein.

In a specific form of the invention, subcarrier frequencies coordinated to a plurality of channels are frequency modulated with the individual signals of a plurality of signal sources. The frequency modulated subcarriers are frequency division multiplexed and utilized to modulate a carrier wave. The carrier frequency is frequency modulated with a low modulation index of about 0.2 to 0.25 by all frequency division multiplexed subcarriers and is transmitted successively. At the receiver both first order sideband components are received. Because of the low modulation index, the amplitude of the higher order sideband components are considerably reduced to a low level below the amplitude of the first order sideband components. In order to separate the different FM subcarrier bands of the first order sideband components, channel filters are provided which are tuned to the bandwidth of the corresponding subcarrier band of the upper or lower sideband. The outputs of the equal numbered subcarriers of the upper and lower sideband are combined for diversity utilization. The diversity combiner selects the optimum signal received and applies it to a detector which provides the demodulated individual signals.

Figure 1:
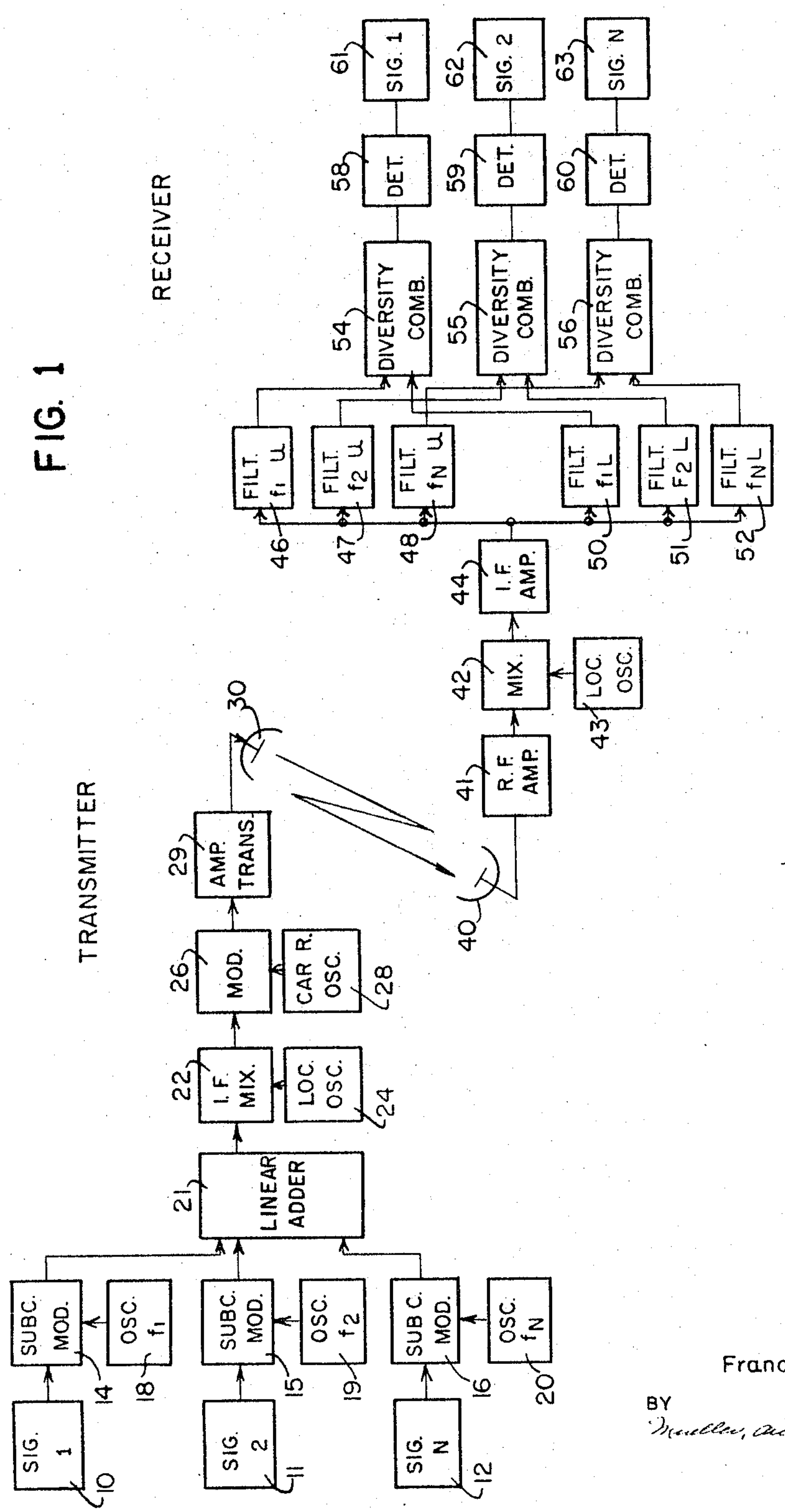
FIG. 1 is a block diagram of the multiplexing and modulating equipment at the transmitter and of the demodulating and separate sideband detection equipment at the receiver.

Referring now to the drawings, FIG. 1 shows a block diagram of the transmitter. The transmitter comprises a plurality of input sources 10, 11 and 12 for the signals S*i*G1, S*i*G2 and S*i*GN. It will be apparent that the system may have more input sources, and the ones indicated are representative of all. The input sources may consist of single unmodulated signals or any kind of modulated or multiplexed signals.

The signals of the input sources 10, 11 and 12 are applied to subcarrier modulators 14, 15 and 16 respectively. An oscillator 18 generating the subcarrier frequency *f*1 is coupled to the modulator 14 and respective oscillators 19 and 20 generating the subcarrier frequencies *f*2 and *f*N are coupled to the modulators 15 and 16. In the modulators 14, 15 and 16, the subcarriers are frequency modulated by the signals S*i*G1 S*i*G2 and S*i*GN of the corresponding input sources.

The frequency modulated subcarriers are applied to a combining stage or linear adder 21 to form a signal including the frequency division multiplexed subcarriers which are applied to an intermediate frequency (IF) mixer 22 and superimposed with the frequency of a local oscillator 24. The frequency of the local oscillator may be 70 megacycles which frequency is used as IF in communication systems with ultra high transmission frequencies. For the long range transmission, the IF signal is modulated in a modulator 26 on a carrier frequency generated in an oscillator 28. The carrier frequency usually utilized are between 500 and 5,000 megacycles. After amplification of the modulated carrier frequency in amplifier 29 the FM signal is radiated through antenna 30.

The receiver of the system is also illustrated in FIG. 1, and has an antenna 40 which applies the received signal to a radio frequency (RF) amplifier. The amplified signals are then superimposed in a mixer 42 with the frequency of the local oscillator 43 to produce an IF signal. In an IF amplifier 44 the IF signal is amplified and applied to separate receiver channels for each sideband component subcarrier. These receiver channels comprise the upper sideband filters 46, 47 and 48 for the FM bands of the subcarriers *f*1U, *f*2U and *f*NU and the lower sideband filters 50, 51 and 52 for the FM bands of subcarriers *f*1L, *f*2L to *f*NL. It will be apparent that the number of channel filters is twice the number of the input sources at the receiver, because the upper and lower sidebands of each subcarrier are selected. The system may have more channels than the three illustrated and the ones indicated are representative of all.

The signals from the channel filters are applied to diversity combiners 54, 55 and 56 in such a way that the corresponding upper and lower channel filters of the same subcarrier are coupled to the input of one diversity combiner respectively. Detectors 58, 59 and 60 are coupled to the output of the diversity combiners 54, 55 and 56 which demodulate the subcarriers and apply a signal to output circuits 61, 62 and 63 respectively. The signals S*i*G1, S*i*G2 to S*i*GN correspond to the signals at the input sources and may represent direct information, or information which has to be processed in further equipments to provide understandable information.

The transmitter described for a separate sideband reception technique uses according to the invention a sufficiently low modulation index for FM. Thus, only the characteristic first order sideband components are generated with high amplitude. The amplitudes of the higher order sidebands which components may overlap other first order sideband components when a complex modulating waveform is used, can be reduced to an arbitrarily low level below the first order sidebands by using a small subcarrier modulation index of about 0.2 to 0.25.

The receiver comprises, as already described, channel filters for the upper and lower sidebands of each FM subcarrier. The outputs of the filters corresponding to the same subcarrier are combined for dual diversity utilization. The diversity reception takes advantage of the fact that signals of the lower and upper sidebands do not fade simultaneously. Thus, the diversity combiners choose the signal with highest amplitude and provide good reception of the transmitted information. Because each sideband is selected independently, non-coherence of the sidebands does not affect the reception.

Figure 2:
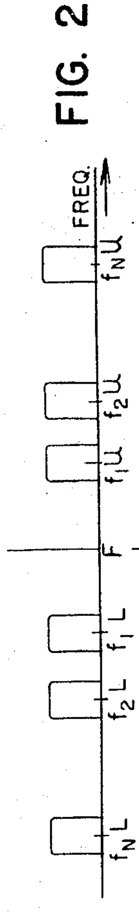
FIG. 2 shows the distributed channel spacing of the first order sidebands of the FM subcarrier frequencies *f*1, *f*2, to *f*N.
Figure 3:
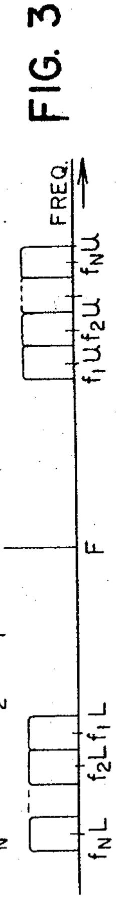
FIG. 3 shows an octave channel spacing of the first order sidebands.

Considering the channel frequency assignment, it has been found that a distributed channel spacing and an octave channel spacing give good results. The distributed channel spacing employs subcarriers which are odd multiples of the lowest subcarrier frequency. FIG. 2 shows that with this spacing, gaps are left between channels. In the octave channel spacing (FIG. 3), however, the channels are spaced in such a way that the highest numbered channel is slightly less than twice the frequency of the lowest numbered channel. Both types of channel spacing give good immunity to distortion products for low modulation indexes. Concerning the immunity to interchannel interference, the distributed channel spacing has an advantage in that the channels are spaced twice as far apart. This is important when one particular channel can drop in amplitude due to a fade while its neighbor is not experiencing the same fade. The use of separate receiver channels for each sideband gives good results for both channel spacing techniques, even when the coherent bandwidth of the transmission path is less than the total information bandwidth.

The system described can be provided by the use of well known circuits which are available in simple form. The equipment described can have as many as 24 information channels and provide reliable communication over long haul transmissions, and is not critical of adjustment. A great advantage is that the unwanted sideband energy can be reduced by using a low modulation index within practical limits so that independent sideband detection can be used with FM modulation of all subcarrier channels. The efficiency of the independent sideband technique is such that reliable communication can be obtained where conventional frequency demodulation does not provide a usable signal.

I claim:

1. A frequency modulation communication system including in combination, a plurality of signal input means for receiving individual signals, a plurality of subcarrier modulation means coupled respectively to said signal input means, first oscillator means coupled to said subcarrier modulation means and applying to each modulation means a subcarrier wave of a different frequency, said subcarrier modulation means providing subcarrier waves modulated by said individual signals, signal-combining means coupled to said subcarrier modulation means to form a frequency division multiplexed signal, second oscillator means providing a carrier wave, carrier wave modulation means coupled to said signal-combining means and to said second oscillator means and providing a carrier wave frequency modulated with a relatively low modulation index by said frequency division multiplexed signal, transmitter means for transmitting the frequency modulated carrier waves, receiver means for receiving said frequency modulated carrier waves, said receiver means including frequency selective means for producing individual signals corresponding to the principal components of the upper and lower sidebands of said modulated carrier waves one component of each said sideband representing each modulated subcarrier wave, diversity combiner means coupled to said frequency selective means for selecting the one of the upper and lower sideband for each subcarrier wave having optimum energy level, and subcarrier wave detector means coupled to said diversity combiner means for deriving said individual signals.

2. A frequency modulation communication system according to claim 1 in which said transmitter means includes a first mixer and a third local oscillator coupled between said signal combining means and said modulation means for generating an intermediate frequency signal by superimposing said frequency division multiplexed signal and the signal of said third local oscillator, and for applying said intermediate frequency signal to said modulation means, and in which said receiver means includes a second mixer and a fourth local oscillator for superimposing the received frequency modulated carrier waves and the signal of said fourth local oscillator to form an intermediate frequency wave and for applying the same to said frequency selective means.

3. A frequency modulation communication receiver, including in combination, input means for receiving carrier waves frequency modulated by a plurality of further modulated subcarrier waves with both an upper and lower sideband of the carrier wave being received with each further modulated subcarrier having upper and lower sideband components in the respective sidebands, individual frequency selective means for passing each said upper and lower sideband components of said further modulated subcarrier waves, respectively, and coupled to said input means for receiving said carrier and its upper and lower sidebands with the respective frequency selective means passing only the respective upper and lower sideband components of said modulated carrier wave corresponding to the respective further modulated subcarrier wave sideband components, signal processing circuit means including diversity combiner means and signal detection means for each of said further modulated subcarrier waves and connected to two of said frequency selective means respectively passing the upper and lower sideband components corresponding to said further modulated subcarrier waves and responsive to receiving said passed signals for selecting the upper or lower sideband component having the greater energy level for deriving signals utilized to further modulate said subcarrier waves.

4. A multiplexed communication system, including in combination, transmitter signal input means for receiving a plurality of individual signals, subcarrier wave generation means coupled to said transmitter signal input means and responsive to said plurality of individual signals to develop a plurality of subcarrier waves having different frequencies, modulation means including carrier generation means and receiving said plurality of modulated subcarrier waves and acting to frequency modulate said generated carrier wave with all of said plurality of subcarrier waves to supply a carrier wave frequency modulated by said plurality of modulated subcarrier waves with each of said modulated subcarrier waves developing respectively a corresponding upper and lower first order sideband component of said carrier wave such that said carrier wave has a plurality of upper and lower first order sideband components, means connected to said modulating means for transmitting said carrier wave, receiver means for receiving said transmitted carrier wave and its upper and lower sidebands, said receiver means including input means for receiving said carrier wave and said plurality of upper and lower first order sideband components, first circuit means coupled to said input means and including a plurality of frequency selective means for separating each of said pluarity of upper and lower first order sideband components one from the other, a plurality of diversity combining means, second circuit means coupling each of said plurality of diversity combining means to two of said plurality of frequency selective means for independently combining the respective corresponding upper and lower sideband components of each of said modulated subcarrier waves for diversity receiving each of the modulated subcarrier waves independently of the other modulated subcarrier waves.

5. The multiplex communications system of claim 4 wherein, said modulating means acts to modulate said carrier wave so that the index of modulation is less than or equal to 0.25.

References Cited

UNITED STATES PATENTS

| | | | |
|---|---|---|---|
| 2,309,678 | 2/1943 | Smith | 325—47 |
| 3,045,114 | 7/1962 | Mindes | 325—305 |
| 3,294,913 | 12/1966 | Saraga | 179—15 |

FOREIGN PATENTS

| | | |
|---|---|---|
| 536,041 | 1/1940 | Great Britain. |

RICHARD MURRAY, Primary Examiner

C. R. VON HELLENS, Assistant Examiner

U.S. Cl X.R.

325—47, 56, 304; 343—200, 206